E. BROWN.
OVEN RACK.
APPLICATION FILED JULY 11, 1914.

1,185,470.

Patented May 30, 1916.
2 SHEETS—SHEET 1.

Witnesses
J. R. Heinrichs
John J. McCarthy

Inventor
Edwin Brown
By Victor J. Evans
Attorney

E. BROWN.
OVEN RACK.
APPLICATION FILED JULY 11, 1914.
1,185,470.
Patented May 30, 1916.
2 SHEETS—SHEET 2.
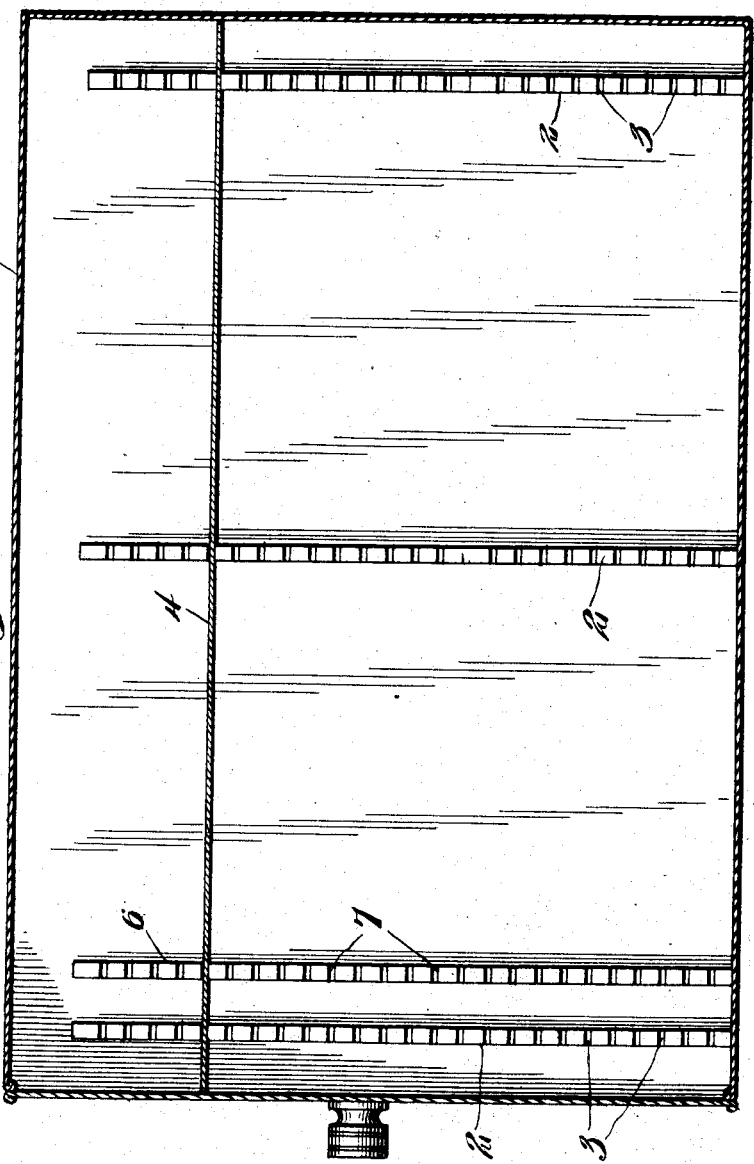
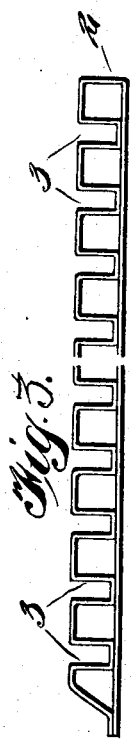
Witnesses
S. R. Heinrichs
John J. McCarthy
Inventor
Edwin Brown
By Victor J. Evans
Attorney

UNITED STATES PATENT OFFICE.

EDWIN BROWN, OF CHESTER, PENNSYLVANIA.

OVEN-RACK.

1,185,470.     Specification of Letters Patent.     Patented May 30, 1916.

Application filed July 11, 1914. Serial No. 850,383.

*To all whom it may concern:*

Be it known that I, EDWIN BROWN, a citizen of the United States, residing at Chester, in the county of Delaware and State of Pennsylvania, have invented new and useful Improvements in Oven-Racks, of which the following is a specification.

This invention relates to improvements in oven racks and has particular application to an adjustable rack.

In carrying out the present invention, it is my purpose to provide a rack of the class described whereby pans of various sizes may be supported within the oven and whereby such pans may be held at any desired height above the bottom wall of the oven.

It is also my purpose to provide a rack of the class described which will embrace the desired features of simplicity, efficiency and durability, which may be manufactured and marketed at a minimum expense and which may be manipulated with ease and convenience.

With the above and other objects in view, the invention consists in the construction, combination and arrangement of parts hereinafter set forth in and falling within the scope of the claim.

Figure 1:
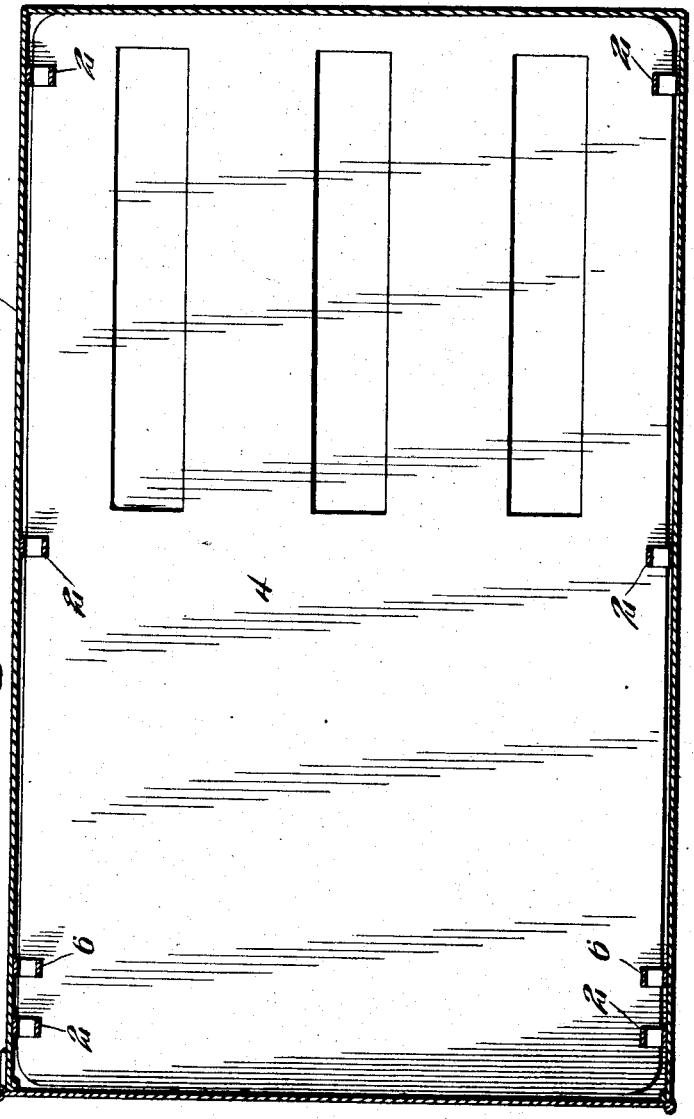
Figure 4:

In the accompanying drawings; Figure 1 is a horizontal sectional view through an oven equipped with a rack constructed in accordance with the present invention. Fig. 2 is a longitudinal sectional view therethrough. Fig. 3 is a view in side elevation of one of the bars of the rack removed from the oven. Fig. 4 is a cross sectional view through the bar.

In the form of the invention illustrated the oven rack comprises a number of vertical bars 2 disposed upon each side of the oven within the latter. The inner side of each vertical bar 2 is formed with a series of horizontal grooves 3 alining with the grooves in the remaining bars and spaced apart vertically. A number of the vertical bars 2 are disposed within the oven along each side wall thereof and appropriately spaced apart and the bars at one side of the oven aline with those at the opposite side and coöperate therewith to form supports. Any suitable means may be employed for maintaining the bars within the oven in proper relative positions.

Capable of sliding movement into and out of the alining grooves within the vertical bars 2 and interchangeably associated with such grooves are trays 4. Reference being made particularly to Fig. 1 it will be noticed that each tray 4 is provided at its 4 corners with rounded edges 4', it being remembered that the tray is made of such a thickness as to fit snugly in the grooves of the bars 4 so as to remain tightly in position. The advantage of rounding the corner edges of the tray will be manifest when it is desired to quickly insert the tray into the grooves for if the corners were rectangular they could ordinarily abut against the inner edges of the grooves of the bars which would prevent the tray being quickly slid into position. But as the corners are rounded they act as beveled surfaces which will make any corner of the tray glide away sufficiently from the walls of the oven rack to make it engage the inner edges of the grooves of the bars which are secured to said walls whereby the opposite longitudinal edges of the tray will be spaced from the wall.

In order that the trays will be guided into the proper grooves in the bars at the rear of those at the front of the oven, I employ guide bars 6 arranged at the rear of the supporting bars 2 at the forward end of the oven and formed with grooves 7 alining with the grooves in the supporting bars and designed to guide the trays into the grooves in the rear supporting bars. The guide bars 6 are spaced apart from the forward vertical bars 2 a short distance so that the grooves therein coöperate with the grooves in the bars 2 to form, in effect, a continuous way whereby the trays are held against vibration and in a horizontal plane while the same are being inserted in the oven.

From the foregoing description taken in connection with the accompanying drawings, the construction and manner of employing my improved oven rack will be readily apparent.

It will be seen that the trays may be spaced apart vertically from each other any desired distance.

I claim:

In a device of the class described in combination an oven rack, a plurality of vertical bars secured upon opposite walls of said oven rack in spaced apart relation, said bars being formed with a series of horizontal grooves, the grooves of the several bars being in alinement, a tray having rounded corners, said tray adapted to be slid into any of said grooves of all of said bars and having its rounded corners adapted to guide said tray into the grooves and away from the inner edges of the bars, said tray being of such thickness as to fit snugly in the said grooves.

In testimony whereof I affix my signature in presence of two witnesses.

EDWIN BROWN.

Witnesses:
WILLIAM HENRY BROWN,
ISABELL BROWN.

Copies of this patent may be obtained for five cents each, by addressing the "Commissioner of Patents, Washington, D. C."